March 31, 1931.  C. C. ROCK  1,798,499
DISK BRAKE
Filed Aug. 3, 1927   2 Sheets-Sheet 1
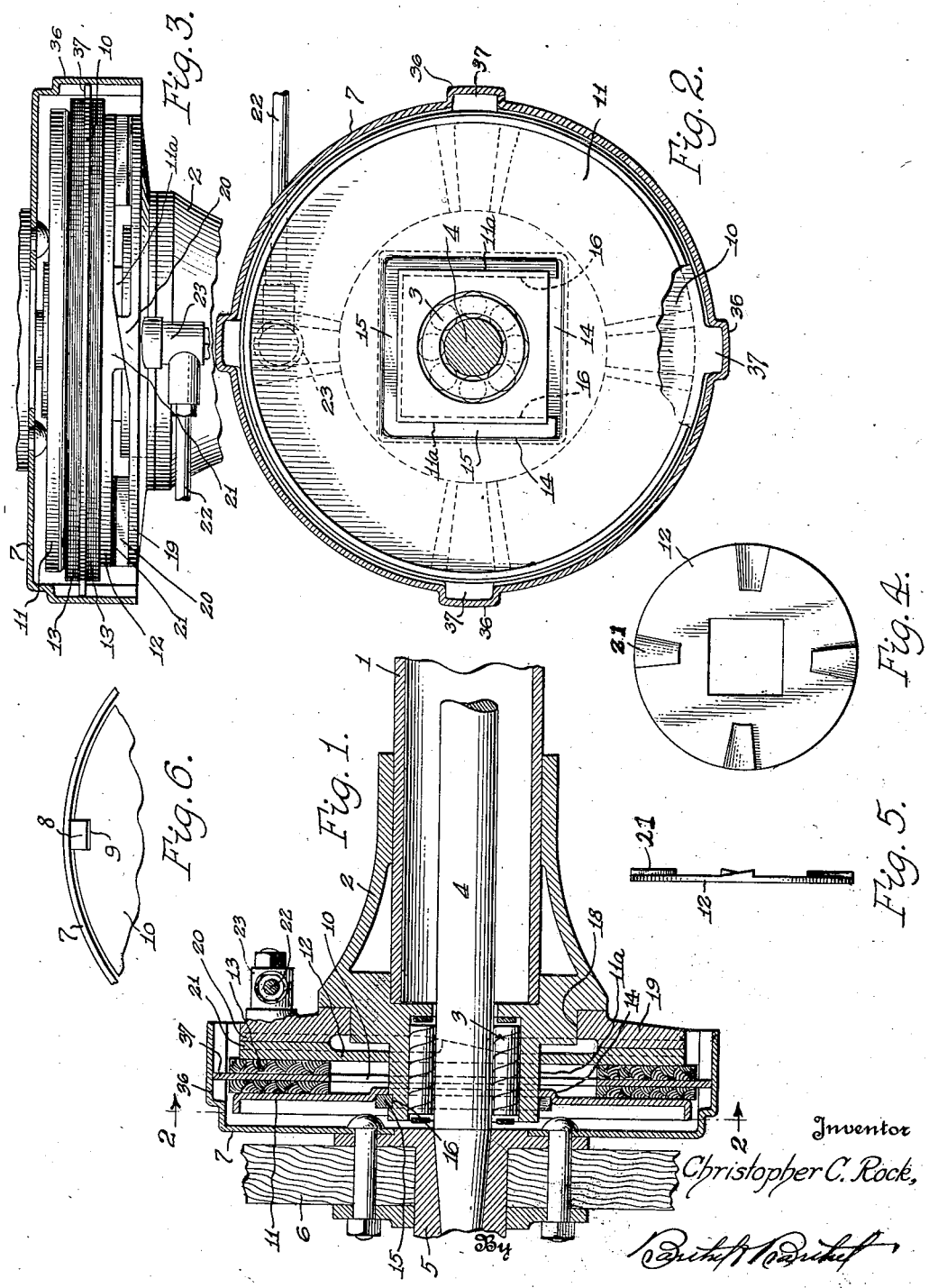

March 31, 1931.　　　C. C. ROCK　　　1,798,499
DISK BRAKE
Filed Aug. 3, 1927　　　2 Sheets-Sheet 2
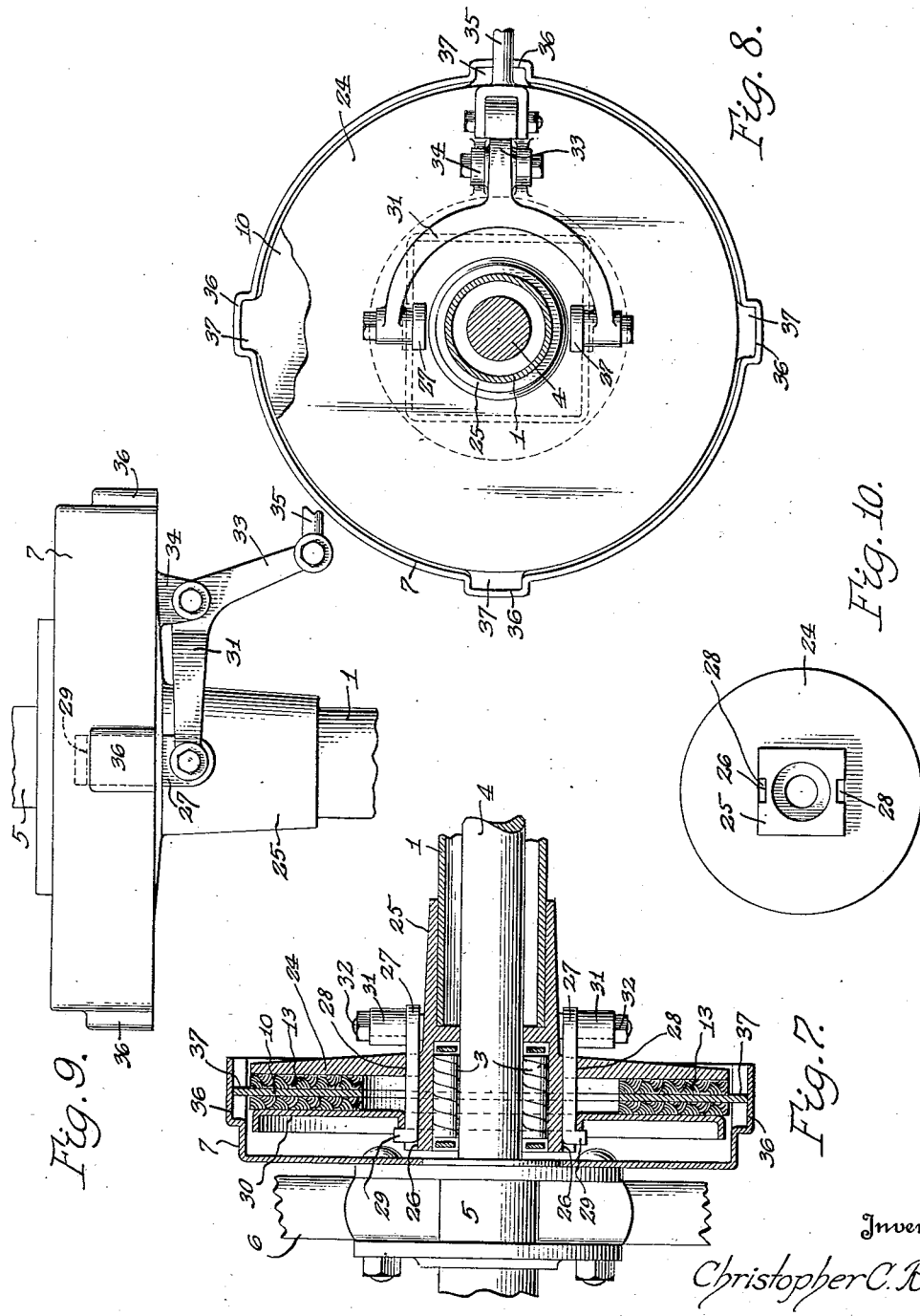

Patented Mar. 31, 1931

1,798,499

UNITED STATES PATENT OFFICE

CHRISTOPHER C. ROCK, OF DETROIT, MICHIGAN, ASSIGNOR OF ONE-THIRD TO AARON W. BURLEY AND ONE-THIRD TO HENRY J. KINLEY, BOTH OF DETROIT, MICHIGAN

DISK BRAKE

Application filed August 3, 1927. Serial No. 210,220.

This invention relates to disk brakes for vehicles and particularly automobiles and that type of vehicles having axle housings and driven wheels. Such vehicles are ordinarily provided with rear axle brakes in the form of drums attached to the rear wheels with interior and exterior brake shoes or bands adjustable relative to the drums to effect a braking action for the wheels. The brake shoes or bands are ordinarily provided with liners that are subjected to considerable wear and tear and consequently need renewing. The operation of disassembling the parts of an ordinary brake require considerable time and labor, and my invention aims to provide a brake wherein the assembled parts may be easily and quickly disassembled, when it is necessary to repair or renew any part, thereby saving considerable time and labor.

My invention further aims to provide a disk brake wherein a plurality of disks are compactly assembled between a wheel and an axle housing and are adapted to be crowded together to produce a braking action for the wheel.

My invention will be hereinafter specifically described and then claimed, and reference will now be had to the drawings, wherein Figure 1 is a longitudinal section view of the disk brake mechanism;

Fig. 2 is a cross sectional view on the line 2—2 of Fig. 1;

Fig. 3 is a plan of the disk brake mechanism;

Fig. 4 is an elevation of a cam member;

Fig. 5 is an edge view of the same;

Fig. 6 is a detail view showing the manner of interlocking a shiftable disk relative to a drum;

Fig. 7 is a view similar to Fig. 1 illustrating a modification of my invention;

Fig. 8 is a view of the inner side of the disk brake mechanism;

Fig. 9 is a plan of the same, and

Figure 10 is an end view of the detached housing member.

Reference will first be had to Figs. 1 to 6 inclusive showing the end of a rear axle housing 1 and mounted on the end of said housing is a journal member 2 containing an antifrictional roller bearing 3 for a driven axle 4. Mounted on the end of said axle is the hub 5 of a wheel 6 and attached to the inner face of said wheel is a drum 7. The peripheral wall of said drum is provided with a plurality of pressed out longitudinal ways 36 for peripheral keys 37 on a shiftable disk 10 arranged in the drum to rotate therewith and be axially shifted relative to the drum.

The housing member 2 has that portion thereof supporting the roller bearing 3 provided with facets 11a and slidably mounted on said facets are non-rotative disks 11 and 12. These disks have the inner faces thereof provided with annular shoes 13 confronting the shiftable disk 10 and with the shiftable disk sandwiched between the non-rotative disks, all of said disks may be crowded together to effect a braking action against the wheel 6. This is brought about by the non-rotative disks being carried by the housing member 2 and the shiftable disk held by the wheel drum 7.

The non-rotative disk 11 has a central countersunk portion 14 and set therein is an inverted U-shaped key 15 which also engages in a groove 16 provided therefor in the end of the housing member 2.

Rotatable on an annular shoulder 18 of the housing member 2 is an oscillatory cam member 19 provided with a plurality of cams 20 normally engaging cam surfaces 21 on the outer face of the non-rotative disk 12. These confronting cam surfaces are best shown in Fig. 3 and for oscillating the cam member 19 a reach rod 22 is employed, said rod being suitably connected to a stud portion 23 of the cam member 19.

The key 15 on the end of the housing member 2 serves as an abutment and when the cam member 19 is turned counterclockwise, referring to Fig. 3, the non-rotative disk 12 is forced towards the other non-rotative disk 11 and in consequence of this axial movement the three disks are crowded together to the extent of producing a braking action for the vehicle wheel.

Considering Figs. 7 to 10 inclusive there is a stationary disk 24 carried by a housing member 25 provided with keyways 26 for longitudinally disposed keys 27 which extend through openings 28 provided therefor in the stationary disk 24. The keys 27 have outturned ends 29 engaging a non-rotatable disk 30, somewhat similar to the non-rotatable disk 11. The disk 30 is adapted to be shifted towards the stationary disk 24 to effect a braking action against the drum disk 10, and for shifting the keys 27 a fork 31 is employed. This fork has its ends pivotally mounted on trunnions 32 carried by the keys 27 and said fork has a crank portion 33 pivotally mounted between apertured ears 34 carried by the stationary disk 24. The rod 35 may be pivotally connected to the crank portion 33 of the fork 31 for rocking said fork to shift the keys 27 and apply the brake.

Instead of providing the drum 7 with keyways 36, I may provide the drum with inwardly projecting keys 8 to extend into notches or keyways 9, of the shiftable disk 10 as shown in Fig. 6.

Again considering Figs. 1 to 6 inclusive, it is only necessary to remove the wheel 6 and the key 15 in order that easy access may be had to the disks when it becomes necessary to renew any of these parts. To remove the key 15 the oscillatory cam member 19 may be turned to permit of the disk 12 receding and by pressing inwardly on the disk 11 the key 15 can be removed, otherwise the inset portion of the disk 11 locks the key 15 against accidental displacement.

In the arrangement shown in Figs. 7 to 10 inclusive, the wheel 6 can be removed, the keys 27 disconnected from the fork 31 and then access had to the disks or shoes. In either arrangement the parts may be readily lubricated and maintained in an operatable condition, and it is obvious that friction disks have as great a braking power as bands and shoes of the usual and well known type.

It is thought that the operation and utility of the brake mechanism will be apparent without further description, and while in the drawings there are illustrated the preferred embodiment of my invention, it is to be understood that the structural elements are susceptible to such changes as fall within the scope of the appended claim.

What I claim is:—

An automobile brake assembly comprising an axle housing, a journal member mounted on the end of said housing and having the outer end provided with facets, a driven axle mounted in said journal, a wheel mounted on said axle, a drum secured to the inner face of said wheel and provided with a plurality of peripheral longitudinal ways, a disk mounted on said journal and held against rotation by said facets, a U-shaped key received in a groove in said journal and adapted to prevent displacement of said disk, an annular shoe mounted on the inner face of said disk, a longitudinally shiftable disk mounted on said journal and having projecting keys extending into said ways in said drum whereby said disk rotates with said drum, a cam faced disk mounted on said journal and secured against rotation by said facets, an annular shoe secured to the outer face of said lastnamed disk, a cam faced disk rotatably mounted on said journal whereby rotation of the latter disk causes said cams to crowd all of said disks against said first named disk and to cause said annular shoes to engage said disk which rotates with said drum, and means for rotating said last named cam faced disk.

In testimony whereof I affix my signature.

CHRISTOPHER C. ROCK.